2,993,931
PROCESS FOR PREPARING UREA AND AN AROMATIC AMINE
John A. Patterson, Fishkill, and Harold V. Atwell, Wappingers Falls, N.Y., assignors to Texaco Inc.
No Drawing. Filed Dec. 26, 1958, Ser. No. 782,997
5 Claims. (Cl. 260—555)

This invention relates to a process for preparing urea and an aromatic amine from carbon monoxide and ammonia. Urea is useful as a fertilizer and as a reactant for making plastics and resins. Aromatic amines are useful chemical intermediates in the preparation of dyes, detergents and many other end products.

Broadly our process is for the simultaneous preparation of urea and an aromatic amine and it comprises contacting gasiform carbon monoxide with ammonia and a nitroaromatic compound in the presence of a solid particulate dehydrogenation catalyst at a pressure of at least 200 p.s.i.g. and a temperature between 160° and 350° F., and thereafter recovering urea and said aromatic amine from the resulting mixture.

The dehydrogenation catalyst is essential to the most effective operation of our process. The catalysts useful in our process are particularly the oxides and sulfides of groups VI and VIII metals, frequently in combination with a surface active material such as silica or alumina. Examples of advantageous dehydrogenation catalysts for use in our process are molybdenum sulfide on alumina, molybdena-alumina, and nickel tungsten sulfide.

The catalyst is preferably in a fixed bed, but it can be suspended in the reaction mixture if desired. Reaction time can be from about a minute to as long as 10 hours or even more; preferably it is between 10 minutes and 4 hours. In continuous systems reaction time is calculated as an average reaction time, and it is based on the volumetric feed rate of the materials, other than the ones fed in gaseous state, to the reactor and the empty reactor space.

The process is practiced in the presence of a substantially inert liquid vehicle such as methanol, ethanol, isopropanol or other lower ($C_1$—$C_8$) alkanol, petroleum ether, benzene, isopropyl ether, trichloroethylene, aqueous $C_1$—$C_3$ alkanols, ethylene glycol, 2-methoxyethanol-1, tetrahydrofurfural alcohol, and formamide. The inert vehicle broadly composes about 40 to about 95 weight percent of the reaction mixture as charged, and preferably it is from 70 to 90 weight percent of such mixture. The pressure in the operation should be at least sufficient to suppress substantial volatilization of the liquid vehicle employed. Suitably, the pressure in our process is from 200–2000 p.s.i.g. and preferably it will be between 300 and 1000 p.s.i.g. It is especially advantageous that the reaction vehicle be a solvent at reaction conditions employed for the urea being made, thereby eliminating some solids handling problems in the reactor.

When ammonia is used the product is urea (carbamide). Substituted ammonias yield correspondingly substituted ureas. Suitable amines for the process are hydrocarbyl primary monoamines such as isobutylamine, n-decylamine, and ethylamine. Generally the alkyl primary amines are the most suitable substituted ammonias to use, but use of hydrocarbyl primary monoamines having ethylenic unsaturation, or even amine alcohols such as monoethanolamine, also are reactants conceivable for our process.

Broadly the temperature for the operation should be between about 160 and about 350° F. When ammonia is the reactant we prefer to use a temperature between about 200 and 300° F. Generally the use of substituted ammonia reactants calls for use of a higher temperature than does the reaction when ammonia itself is employed.

While the carbon monoxide reactant can be concentrated, e.g. 90 volume percent or higher, carbon monoxide gas streams that are comparatively dilute can also be used because our process is substantially insensitive to ill effects from such dilution (this is not the case when elemental sulfur and solubilizing $H_2S$ are used). Thus, in our process the CO stream can contain 0.2–4 volume parts of carbon monoxide per volume part of hydrogen, nitrogen or other diluent. A suitable CO gas can be generated by the combustion of metallurgical coke with air, or by the partial oxidation of carbon containing substance with oxygen or air to make substantial quantities of hydrogen in connection with the production of CO, a conventional synthesis gas. The carbon monoxide feed also can contain substantial amounts of carbon dioxide, e.g. upwards to 25% or even more as well as carbonyl sulfide, hydrogen sulfide and associated sulphureous impurities which are frequently present in carbon monoxide-bearing streams; these impurities need not be cleansed from the gas. The comparative insensitivity of my process to diluents in the CO makes it especially economical.

The mol ratio of ammonia:carbon monoxide used in our process can be between about 10:1 and about 0.1:1 or even lower, but preferably it will be between about 0.1:1 and about 0.5:1 for efficiency and economy in the practice of the process. The mol ratio of ammonia:nitroaromatic compound will be generally broadly between about 2:1 and about 10:1, and preferably it will be between about 3:1 and about 5:1. Suitable materials of construction for use in my process include corrosion resisting ones such as an austenitic stainless steel.

Advantageously the nitroaromatic compound used is a nitrohydrocarbon which is normally a liquid, and preferably it is nitrobenzene. Suitably, also, the nitroaromatic compound can be a polynitro compound; the nitro group or groups will be attached to the aromatic nucleus. Suitable nuclei include the aryl radicals phenyl, naphthyl, biphenyl, corresponding nuclear alkylated radicals, e.g. ones wherein there are one or more alkyl groups of 1 to 12 carbon atoms such as tolyl, xylyl and the like alkaryl radicals, and corresponding radicals having plural nitro substitution on the nucleus.

Recovery of the urea can be done by crystallizing it from the reaction mixture or from such mixture which has been partially stripped of reaction vehicle. The aromatic amine such as aryl primary amine and alkaryl primary amine can be recovered by extraction of the reaction mixture with ether or a light hydrocarbon such as a paraffinic naphtha fraction, benzene, or the like, then removed from the resulting extract solution by conventional procedures such as precipitating with hydrogen chloride. Alternatively, the amine can be fractionally distilled from the reaction vehicle after extraction or other separation of the urea.

The following example shows how our process has been practiced, but it should not be construed as limiting the invention.

*Example*

In this run the catalyst used was nickel tungsten sulfide in the form of black, ¼" diameter by about ¼" high cylindrical pellets. The catalyst had specific surface of 10.4 square meters per gram; it contained 18.3% nickel, 31.9% tungsten, and 23.7% sulfur. The reactor used was a stirred batch pressure vessel made of austenitic stainless steel and having 1535 cc. volume. The reactor was charged with 65 grams of ammonia, 123 grams of nitrobenzene, 100 grams of catalyst, 600 cc. of methanol, and carbon monoxide gas to maintain the pressure in the reactor at about 500 p.s.i.g. The reactor was kept at 243° F. for 3 hours.

At the end of the run the reactor was cooled, vented to atmosphere, and the product mixture removed. The product mixture was filtered to remove catalyst and the filtrate distilled to a pot temperature between about 185 and 194° F. Urea was recovered by crystallization from the distilland residue, and aniline was recovered from the liquid material by dissolving such material in ether and precipitating aniline hydrochloride with hydrogen chloride. The weight yield of urea was 17.8 grams, and it amounted to 27.4 weight percent of ammonia charged.

We claim:

1. The process of claim 5 wherein said carbon monoxide gas is dilute.

2. The process of claim 5 wherein the aromatic nitrohydrocarbon is nitrobenzene and the amine formed is aniline.

3. The process of claim 5 wherein the catalyst is nickel tungsten sulfide.

4. The process of claim 5 wherein the temperature is 200–300° F. and the pressure is 300–2000 p.s.i.g.

5. A process for the simultaneous preparation of urea and aromatic amine selected from the group consisting of aryl primary amine and alkaryl primary amine which comprises contacting carbon monoxide with ammonia and an aromatic nitrohydrocarbon selected from the group consisting of aryl nitrohydrocarbon and alkaryl nitrohydrocarbon, at a mol ratio of ammonia:carbon monoxide between about 10:1 and 0.1:1 and at a mol ratio of ammonia:nitrohydrocarbon between about 2:1 and 10:1 in the presence of an inert liquid reaction vehicle, said vehicle comprising between about 40 and 95 wt. percent of the reaction mixture, and in the presence of a solid particulate dehydrogenation catalyst selected from the group consisting of molybdenum sulfide on alumina, molybdena-alumina, and nickel tungsten sulfide at a pressure from 200 to 2,000 p.s.i.g. and temperature between 160° F. and 350° F. and thereafter recovering urea and said aromatic amine from the resulting mixture.

References Cited in the file of this patent

UNITED STATES PATENTS

| | | |
|---|---|---|
| 2,620,356 | Munday | Dec. 2, 1952 |
| 2,716,135 | Winstrom | Aug. 23, 1955 |
| 2,857,430 | Applegath et al. | Oct. 21, 1958 |